Feb. 20, 1934.  C. L. JOHNSON  1,948,234
HEAT METER
Filed Feb. 13, 1931  2 Sheets-Sheet 1

Inventor
Cecil L. Johnson
By Clarence A. O'Brien
Attorney

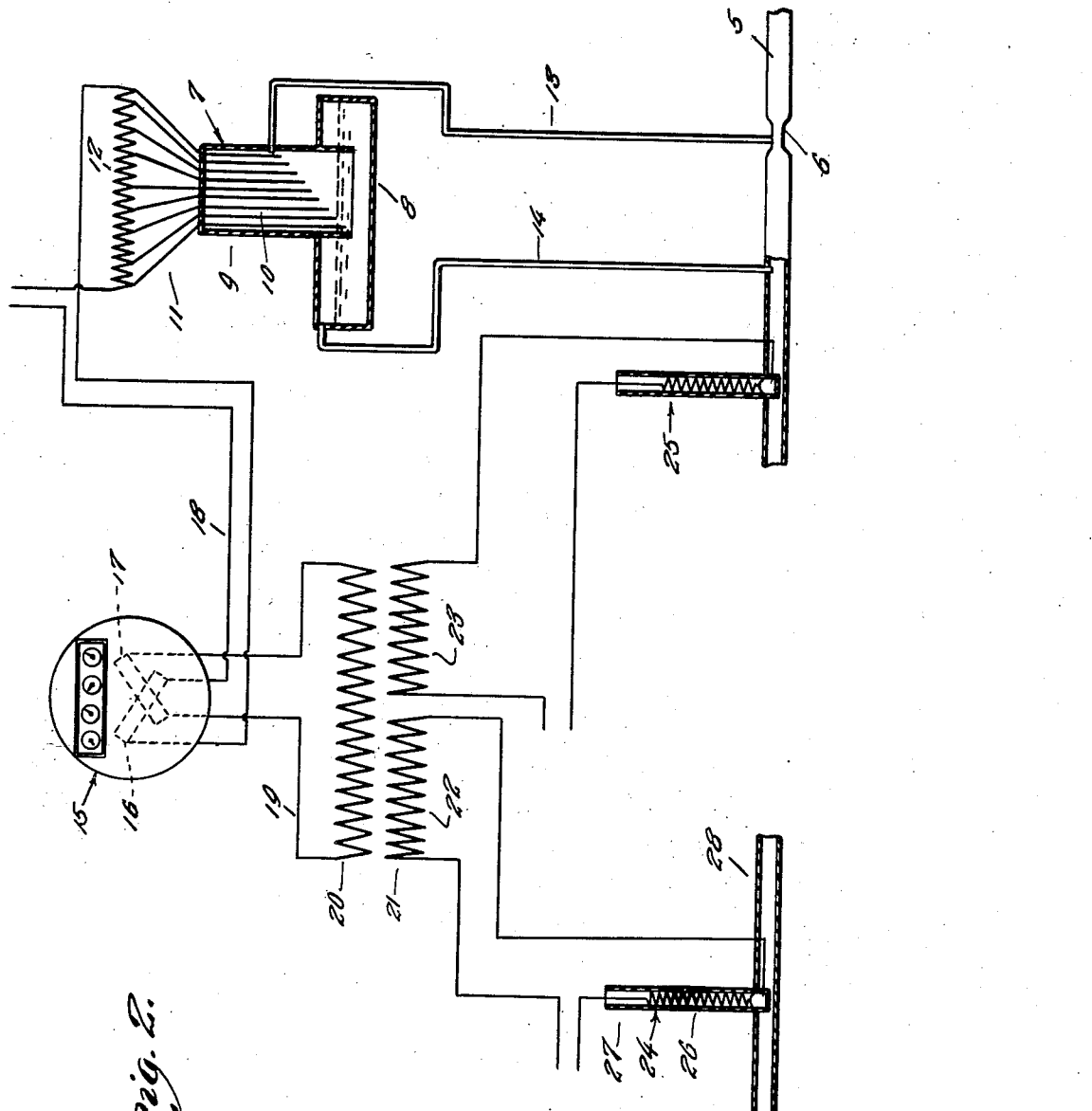

Patented Feb. 20, 1934

1,948,234

UNITED STATES PATENT OFFICE 1,948,234

HEAT METER

Cecil Leroy Johnson, Toledo, Ohio

Application February 13, 1931. Serial No. 515,624

1 Claim. (Cl. 73—184)

This invention appertains to new and useful improvements in means for electrically measuring heat units (B. t. u.)

Hot water heating is ideally adapted to residential requirements for its ease of control from a central point. However, it is an expensive utility and its waste by unscrupulous consumers cannot be ascertained.

It is at present necessary to charge flat rates and these are set at high figures to protect the operating companies against wastage by the consumers.

The present invention aims to overcome this loss and to provide means for charging consumers who do not economize on the use of this energy by the installation of a register which will accurately register the heat units abstracted at the consuming point.

During the course of the following specification and claim, various important objects and advantages of the invention will become apparent to the reader.

In the drawings:—

Fig. 2 represents a diagrammatic view disclosing the electrical devices of the present invention in the connections between the same.

Figure 1:
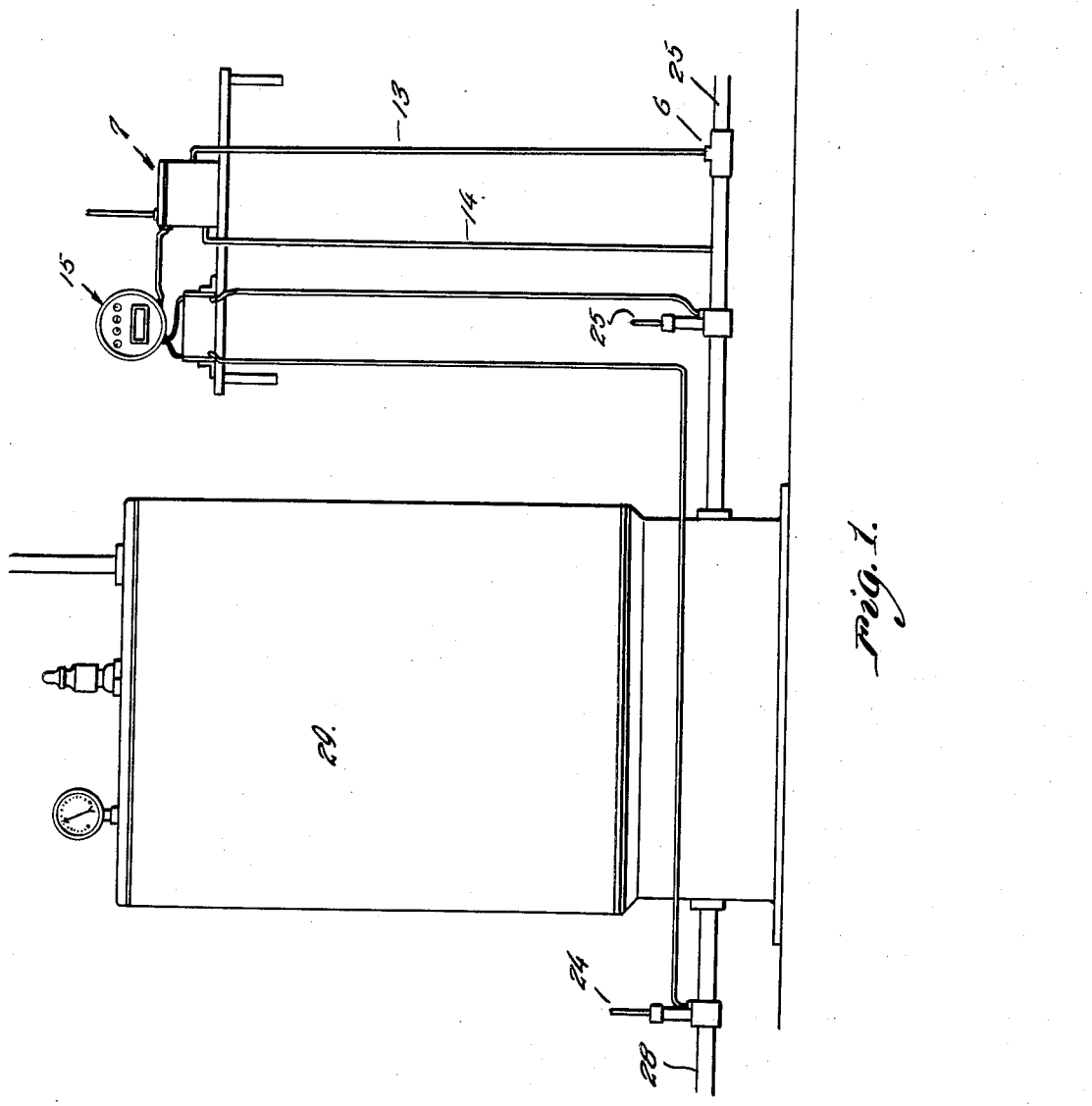
Figure 1 represents a side elevational view of a heat abstracting or consuming device and the invention associated therewith.

Referring to the drawings wherein like numerals designate like parts, it can be seen that numeral 5 represents the supply pipe having the venturi 6 therein.

Numeral 7 generally refers to a mercury manometer consisting of the reservoir 8 and the stack 9 in which depends the resistance elements 10 of graduated lengths, and from each of which extends a wire 11 connected to the external resistance 12. From the venturi 6 extends a tube 13 communicating with the stack 9 at the intermediate portion thereof, while a tube 14 extends from the supply pipe 5 at a point toward the heat consuming device 29 from the venturi 6 and this pipe 14 communicates with the reservoir 8 adjacent the top thereof. The manometer is of the well known type and is used in steam flow meter practice. The principle of operation is as follows:—When fluid flows through a Venturi tube 6, the static pressure at the neck of the Venturi tube to which the pipe 13 is connected, is diminished in accordance with Bernoulli's law, while the pressure in pipe 14 at the point of its connection with conduit 5 is equal to the static pressure in conduit 5. This action causes a difference in pressure between the spaces above the body of liquid in reservoir 8 and the stack 9, causing the mercury in body 8 to rise into stack 9, short circuiting the successive increments of resistance 12. The increments of resistance 12 are so chosen, that the resistance of element 12 is proportionate to the rate of flow of liquid in conduit 5, thus the current flowing in meter element 16 is proportionate at all times to the range of flow of liquid.

Numeral 15 represents a watt hour meter including the usual balance coils 16 and 17. 16 is in the circuit 18 with the external resistance 12 and the source of energy, the latter not being shown. The coil 17 is in a circuit 19 with the secondary 20 of the differentially wound current transformer generally referred to by numeral 21. The conventional watt hour meter, while not shown in the drawings in detail, is of the induction type, operating on the principle of the rotating magnetic field of the induction motor, the same including the usual metallic rotary disk.

This transformer 21 has equal primary windings 22 and 23. The primary winding 22 is in circuit with the temperature responsive device generally referred to by numeral 24 and with a suitable source of electricity, the latter not being shown. The primary winding 23 is in circuit with the temperature responsive device generally referred to by numeral 25, and also with a source of electricity, the latter not being shown. The principal function of the windings 22—23 is to impress upon the iron core (not shown) of the transformer, the difference between their respective fluxes, they being supplied with alternating current from the same source which supplies A. C. to the resistance 12. When the windings 22—23 are supplied with equal voltage, the magnetic fluxes are equal, and of opposite polarity, and neutralize one another. However, when different temperatures exist in conduits 5 and 28 and the mercury in elements 24 and 25 rises to heights determined by temperatures to which the measuring devices 24 and 25 are exposed, thus varying the resistance in elements 24 and 25. With alternating current supplied to the circuit containing the winding and device 23—25 and winding and device 22—24 respectively, two magnetic fluxes of unequal value and opposite polarity by the coils 22—23 are impressed upon the core of the transformer. Therefore, the magnetic flux traversing the iron core of the transformer, and introducing current in secondary 20 of the transformer, is proportional to the temperature difference existing between fluids in conduits 5 and 28.

Each of the temperature measuring devices includes a resistance 26 located within a tube 27 containing mercury and partially in the supply pipe 5 and the return pipe 28, one of these measuring devices being provided at each side of the heat consuming or abstracting apparatus 29.

Interposed between the supply pipe 5 and the return pipe 28 and between the devices 24 and 25 is the heat abstracting apparatus, generally referred to by numeral 29. This can be in the nature of a boiler, a sterilizer, a radiator, or in fact any one of a number of hot water heated appliances.

In operation, the water flows thru the venturi 6 which causes a pressure difference between the connections 13 and 14, that is proportionate to the square of the velocity of the water flowing in the supply pipe 5. This pressure is transmitted to the mercury manometer 7 through the pipe circuit 13—14 and causes the mercury in the reservoir 8 to rise into the stack 9, making contact with the resistance elements 10 and short-circuiting the various sections of the external resistance 12, to which the elements 10 are tapped.

The external resistance 12 is connected in series with a suitable source of alternating current and also with the winding 16 of the watt hour meter in the manner hereinbefore described. The values of the sections of the external resistance 12 are so chosen, that a current is transmitted to the winding 16, that is directly proportionate to the flow of water and the supply pipe 5, measuring in pounds.

Thus, there is a current in the winding 16 that is proportionate to the weight of water flowing in the supply pipe 5. Thus, as the height of the mercury in the temperature measuring devices 24 and 25 is proportioned to the temperature in the return and supply pipes, the resistances 26 are proportioned to the temperature in the return and supply pipes.

Then, current will flow in the equal windings 22 and 23 of the primary of the transformer, grading magnetic fluxes proportionate to the temperatures in the return and supply pipes 28 and 5, and due to the differential winding of the primary of the transformer, a flux is set up in the transformer that is equal to their difference. Thus the flux acting upon the primary in the current produced therein is proportionate to the difference in temperature at the temperature measuring devices 24 and 25, and as this induced current is imposed on the winding 17 of the watt hour meter 15, there is, within the meter, a current in the winding 16 that is proportionate to the weight of the water, and a current in the winding 17, that is proportionate to the temperaure gained or lost by the water.

As the motion of the revolving parts of the meter is caused by the product of the fluxes of the coils 16 and 17, we may express the actions as X (motion of meter) equal to flux in 16 times that in 17 and as these fluxes are proportioned to the states that are being measured, X therefore equals weight times degrees, or British thermal units.

Obviously, numerous changes in the construction of the instruments, as well as the size and shapes thereof, and the arrangement of parts can be resorted to without departing from the spirit and scope of the invention as claimed hereinafter.

Having thus described my invention, what I claim as new is:—

A heat meter comprising a heat supply pipe, a heat return pipe, means in said supply pipe for creating a differential pressure responsive to rate of flow of fluid therein, a manometer, means operatively connecting said manometer to said supply pipe so as to be responsive to the differential pressure created by the first mentioned means, a register meter including a pair of balance coils for operating the indicating mechanism of the meter, said manometer including a resistance, a current supply line, one side of the current supply line being connected to one side of one of the balance coils, the other side of the said coil being connected to one side of the manometer resistance, the other side of the current supply being connected to the remaining side of the manometer resistance, a current transformer including a pair of primary windings, the secondary of the transformer being connected across the remaining balance coil of the meter, a temperature measuring device including a resistance in each of the supply and return pipes in circuit with a corresponding primary wnding of the transformer.

CECIL LEROY JOHNSON.